United States Patent [19]

Juguin et al.

[11] 4,401,557
[45] Aug. 30, 1983

[54] CATALYSTS FOR HYDROCARBON CONVERSION

[75] Inventors: Bernard Juguin, Rueil Malmaison; Germain Martino, Poissy; Jean Miquel, Paris, all of France

[73] Assignee: Societe Francaise Des Produits Pour Catalyse, Rueil Malmaison, France

[21] Appl. No.: 616,123

[22] Filed: Sep. 24, 1975

[30] Foreign Application Priority Data

Sep. 25, 1974 [FR] France .............................. 74 32576

[51] Int. Cl.³ ...................... C10G 35/09; B01J 27/06
[52] U.S. Cl. .................................. 208/139; 252/441; 252/458; 252/461; 252/465; 252/466 PT; 252/470
[58] Field of Search ............... 208/139; 252/441, 458, 252/461, 465, 466 PT, 470

[56] References Cited

U.S. PATENT DOCUMENTS 3,898,154  8/1975  Rausch ................................ 208/139
3,956,103  5/1976  Antos ................................. 208/139
3,960,709  6/1976  Hayes ................................. 208/139

Primary Examiner—Curtis R. Davis
Attorney, Agent, or Firm—Millen & White

[57] ABSTRACT

Reforming process operated in the presence of a catalyst comprising a carrier, platinum, rhodium or osmium, an additional metal consisting of chromium, tungsten, molybdenum, manganese, rhenium, germanium, tin, gallium, indium, thallium, thorium, cerium, samarium, lanthanum, zinc, cadmium, titanium or zirconium, and halogen.

42 Claims, No Drawings

CATALYSTS FOR HYDROCARBON CONVERSION

This invention concerns a catalytic reforming process in which the catalyst comprises (a) a carrier, (b) platinum, (c) at least one metal selected frm rhodium and osmium and (d) at least a third additional element selected from the group consisting of: chromium, tungsten, molybdenum, manganese, rhenium, germanium, tin, gallium, indium, thallium, thorium, cerium, samarium, lanthanum, zinc, cadmium, titanium and zirconium.

Processes for reforming in the presence of catalysts containing platinum deposited on a carrier have been known for a long time. But, in spite of many improvements brought to these catalysts having a platinum base, for example, by incorporating a second metal such as tungsten, molybdenum, rhenium, germanium, iridium, etc, efforts are devoted, even nowadays, to find catalysts with a platinum base which, on the one hand, would give better yields as those obtained up to now and, on the other hand, would have a longer life than that of the known catalysts. Efforts are also devoted to find catalysts having improved mechanical properties; in fact, the reforming catalysts are conventionally employed in fixed or movable bed, in the form of conglomerates, for example balls or extrudates, of appreciable size, thus leaving a sufficient passage to gaseous reactants. Wear of these catalysts results in the formation of far smaller particles which progressively clog the free space and oblige to increase the reactant inlet pressure or even to stop the operation.

Now, although it was known that high yields are obtained, particularly in reforming reactions, by using catalysts comprising a porous carrier, for example alumina, and platinum in association with rhodium or osmium, we have now found that the so-defined catalysts have an increased reforming activity and, above all, a longer life time, when a third additional metal is incorporated to the metal system, said additional metal being selected from: chromium, tungsten, molybdenum, manganese, rhenium, germanium, tin, gallium, indium, thallium, thorium, cerium, samarium, lanthanum, zinc, cadmium, titanium and zirconium.

The yields then remain unchanged over long periods.

An essential feature of reforming process conforming to the invention lies in the use of a catalyst comprising a carrier and (a) platinum, (b) rhodium or osmium, (c) an additional element selected from the group consisting of chromium, tungsten, molybdenum, manganese, rhenium, germanium, tin, gallium, indium, thallium, thorium, cerium, samarium, lanthanum, zinc, cadmium, titanium and zirconium, and (d) a halogen, for example chlorine or fluorine.

The carrier mainly contains an oxide of an element from groups II, III and IV of the periodic classification of elements, for example alumina, silica, alumina-silica, magnesia, magnesia-silica, magnesia-alumina, thorium oxide-silica, etc.

A particularly suitable carrier is alumina.

The catalyst thus employed in the process according to the invention contains, by weight with respect to the catalyst carrier, from 0.005 to 1% and more particularly from 0.05 to 0.8% of platinum, from 0.005 to 1% and more particularly from 0.01 to 0.9% of rhodium or osmium (if desired 0.02-0.8% of rhodium or osmium) and from 0.005 to 5%, preferably from 0.01 to 4%, and more particularly from 0.05 to 3% of one metal from the above-mentioned group, i.e. chromium, tungsten, molybdenum, manganese, rhenium, germanium, tin, gallium, indium, thallium, throium, cerium, samarium, lanthanum, zinc, cadmium, titanium and zirconium.

The catalyst also contains 0.1 to 10% and preferably 0.2 to 5% by weight, with respect to the catalyst carrier, of halogen, for example chlorine or fluorine.

The texture characteristics of the catalyst carrier may also have an effect: the specific surface of the carrier may usefully range from 50 to 600 $m^2$ per gram, preferably from 150 to 400 $m^2/g$, in order to be able to work at reasonably high space velocities and to avoid the recourse to reactors of too big size and the use of excessive amounts of catalyst.

The invention also concerns a new catalyst, which may be used, for example, in reforming and comprises alumina and, by weight, with respect to alumina: (a) 0.005–1% of platinum, (b) 0.005–1% of rhodium or osmium, (c) 0.05–3% of an additional metal selected from the group consisting of chromium, tungsten, molybdenum, manganese, rhenium, germanium, tin, gallium, indium, thallium, samarium, zinc, cadmium, titanium and zirconium, and (d) 0.1–10% of halogen.

The catalyst may be prepared according to conventional methods by impregnating the carrier by means of solutions of the metal compounds whose supply is desired. There is used either a common solution of these metals or distinct solutions for each metal. When using several solutions, intermediate dryings and/or roastings may be performed. Roasting, which is the usual final stop, is conducted for example at about 500°–1.000° C., preferably in the presence of free oxygen, for example, by scavenging with air.

Platinum may be used in any known form, for example, as hexachloroplatinic acid, ammonium chloroplatinate, platinum sulfide, sulfate or chloride. Rhodium and osmium may be used in any known form, for example, as chloride, bromide, sulfate of sulfide, or in the form of, for example, acetylacetonate, osmic acid, chlorosmic acids, etc.

Examples of compounds of additional metals are nitrates, chlorides, bromides, fluorides, sulfates or acetates of these metals, or any other salt or oxide of these metals, soluble in water, hydrochloric acid or other convenient solvent (for example, chromates, molybdates, tungstates, etc.). Heteropolyacids and organic and inorganic complexes containing these additional metals (acetylacetonates, alkyl tin, oxalic, tartric, citric and other complexes, etc.) are also worth to mention.

Halogen may be supplied as one of the above mentioned halides or as hydrochloric acid, hydrofluoric acid, ammonium chloride, ammonium fluoride, gaseous chloride or hydrocarbon halide, for example $CCl_4$, $CHCl_3$ or $CH_3Cl$.

A first method of manufacture comprises, for example, impregnating the carrier with an aqueous solution of nitrate or any other compound of the selected additional metal (other than platinum and rhodium or osmium), drying at about 120° C. and calcining in air for a few hours at a temperature of 500°–1000° C., preferably at about 700° C.; then follows a second impregnation with a solution containing platinum and rhodium or osmium (for example a solution of hexachloroplatinic acid, rhodium trichloride or osmic acid).

Another method consists, for example, of impregnating the carrier with a solution of:
(1) platinum (for example hexachloroplatinic acid), (2) rhodium or osmium (for example rhodium trichloride, osmic acid)
(3) the selected additional metal (for example, a chloride, bromide, fluoride, sulfate or acetate of the selected metal, or any other salt or oxide of the selected metal, soluble in water, hydrochloric acid or any other suitable solvent, for example a chloroplatinate, an acetylacetonate, etc.), and
(4) chlorine or fluorine.

A further method comprises introducing the metal elements by effecting as many successive impregnations as the number of metal elements to be included in the catalyst; for example, rhodium or osmium is first introduced by means of a solution thereof, optionally followed with drying and roasting,
then platinum by means of a solution thereof, optionally followed with drying and roasting,
and finally the selected additional metal, in any of the various forms as previously indicated, the latter impregnation being followed with drying and roasting at a temperature of, for example, about 500°–1,000° C.

It is stated that the above sequence of impregnations is not compulsory and may be altered.

The catalysts thus obtained are used in reactions of catalytic reforming. These reactions are usually carried out at a temperature of about 450°–580° C., a pressure of about 5–20 kg/cm² and a hourly reaction rate usually in the range of 0.5–10 volumes of liquid charge (naphtha distilling at about 60°–220° C.) per volume of catalyst.

The following examples illustrate the invention while not limiting the scope thereof.

EXAMPLE 1

Catalysts A–R are prepared, which all exhibit a specific surface of 230 m²/g, a pore volume of 54 cc/g and a chlorine content of 1.14%. Catalysts A–R all contain 0.20% of platinum, 0.05% of rhodium and 0.50% of a third metal element as defined herein after for each of the catalysts A–R:

|   |   |
|---|---|
| A — chromium | J — thallium |
| B — molybdenum | K — germanium |
| C — tungsten | L — tin |
| D — manganese | M — thorium |
| E — rhenium | N — cerium |
| F — zinc | O — samarium |
| G — cadmium | P — lanthanum |
| H — gallium | Q — titanium |
| I — indium | R — zirconium |

Catalysts A–R were all prepared with alumina of a 240 m²/g specific surface and a 59 cc/g pore volume.

Catalyst A was prepared by adding to 100 g of alumina 100 cc of an aqueous solution of
0.96 g chromic anhydride ($CrO_3$)
2.24 g concentrated HCl (d=1.19)
8 g of an aqueous solution of rhodium trichloride containing 2.5% b.w. of Rh.

After a 5 hours contact, filtration and drying at 100° C., the catalyst is roasted for 4 hours at 530° C. in dry air (drying with activated alumina) and reduced in a stream of dry hydrogen (activated alumina) for 2 hours at 450° C.

The resulting catalyst contains, by weight with respect to the catalyst carrier:
0.20% of platinum
0.05% of rhodium
0.50% of chromium
1.14% of chlorine.

Catalyst D was prepared by admixing 100 g of alumina with 100 cc of an aqueous solution containing:
2.30 g of manganese nitrate $Mn(NO_3)_2(6H_2O)$
2.24 g of concentrated HCl (d=1.19)
8 g of an aqueous solution of chloroplatinic acid containing 2.5% b.w. of Pt
2.00 g of an aqueous solution of rhodium trichloride containing 2.5% b.w. of Rh.

The components were contacted for 5 hours, filtered, dried for 1 hour at 100° C., calcined for 4 hours at 530° C. in dry air (drying with activated alumina) and reduced in a stream of dry hydrogen (activated alumina) for 2 hours at 450° C.

The resulting catalyst contains, by weight with respect to the catalyst carrier:
0.20% of platinum
0.05% of rhodium
0.50% of manganese
1.14% of chlorine.

Catalyst F was prepared by adding to 100 g of alumina, 100 cc of an aqueous solution containing:
0.22 g of zinc sulfate ($ZnSO_4, 7H_2O$)
2.24 g of concentrated HCl (d=1.19)
8 g of an aqueous solution of chloroplatinic acid containing 2.5% b.w. of platinum
2 g of an aqueous solution of rhodium trichloride containing 2.5% of rhodium.

The components were contacted for 5 hours, filtered, dried for 1 hour at 100° C., roasted for 4 hours at 530° C. in dry air (drying with activated alumina) and reduced in a stream of dry hydrogen (activated alumina) for 2 hours at 450° C.

The resulting catalyst contains, by weight with respect to the catalyst carrier:
0.20% of platinum
0.05% of rhodium
0.50% of zinc
1.14% of chlorine.

Catalyst H was prepared by adding to 100 g of alumina 100 cc of an aqueous solution of:
10 cc of gallium nitrate as a solution containing 50 g of gallium per liter
2.24 g of concentrated HCl (d=1.19)
8 g of an aqueous solution of chloroplatinic acid containing 2.5% b.w. of platinum
2.00 g of an aqueous solution of rhodium trichloride containing 2.5% b.w. of Rh.

The components were contacted for 5 hours, filtered, dried for 1 hour at 100° C., calcined for 4 hours at 530° C. in dry air (drying with activated alumina) and then reduced in a stream of dry hydrogen (activated alumina) for 2 hours at 450° C. The resulting catalyst contains, by weight with respect to the catalyst carrier:
0.20% of platinum
0.05% of rhodium
0.50% of gallium
1.14% of chloride.

Catalyst L was prepared by adding to 100 g of alumina 100 cc of an aqueous solution of:
2.6 g of a tin acetic solution containing 22% of tin,
2.24 g of concentrated HCl (d=1.19)
8.0 g of an aqueous solution of chloroplatinic acid containing 2.5% b.w. of Pt
2.0 g of an aqueous solution of rhodium trichloride containing 2.5% b.w. of Rh.

The components were contacted for 5 hours, filtered, dried for 1 hour at 100° C., roasted for 4 hours at 530°

C. in dry air (drying with activated alumina) and then reduced in a stream of dry hydrogen (activated alumina) for 2 hours at 450° C. The resulting catalyst contains, by weight with respect to the catalyst carrier:
   0.20% of platinum
   0.05% of rhodium
   0.50% of tin
   1.14% of chlorine Catalyst P was prepared by adding to 100 g of alumina, 100 cc of an aqueous solution of:
5 g of a solution of lanthanum nitrate containing 10% of lanthanum
2.24 g of concentrated HCl (d=1.19)
8 g of an aqueous solution of chloroplatinic acid containing 2.5% b.w. of platinum
2 g of an aqueous solution of rhodium trichloride containing 2.5% of Rh.

The components are contacted for 5 hours, filtered, dried for 1 hour at 100° C., roasted for 4 hours at 530° C. in dry air (drying with activated alumina) and then reduced in a stream of dry hydrogen (activated alumina) for 2 hours at 450° C. The resulting catalyst contains, by weight with respect to the catalyst carrier:
   0.20% of platinum
   0.05% of rhodium
   0.50% of lanthanum
   1.14% of chlorine.

Catalyst R was prepared by adding to 100 g of alumina 100 cc of an aqueous solution containing:
6.67 g of a zirconium oxychlorine solution containing 7.5% of zirconium
2.24 g of concentrated HCl (d=1.19)
8 g of an aqueous solution of chloroplatinic acid containing 2.5% b.w. of Pt.
2.00 g of an aqueous solution of rhodium trichloride containing 2.5% b.w. of Rh.

The components were contacted for 5 hours, filtered, dried for 1 hour at 100° C., roasted for 4 hours at 530° C. in dry air (drying with activated alumina) and then reduced in a stream of dry hydrogen (activated alumina) for 2 hours at 450° C. The resulting catalyst contains, by weight with respect to the catalyst carrier:
   0.20% of platinum
   0.05% of rhodium
   0.50% of zirconium
   1.14% of chlorine.

The other catalysts have been prepared in the same was according to similar methods which need not to be described herein with further details.

The naphtha to be treated has the following specifications:

| Distillation A.S.T.M. | 80–160° C. |
| Composition: aromatic hydrocarbons | 7% by weight |
| naphthenic hydrocarbons | 27% by weight |
| paraffinic hydrocarbons | 66% by weight |
| Clear Research octane number | about 37 |
| Average molecular weight | 110 |
| Density at 20° C. | 0.782 |

This naphtha is passed with recycle hydrogen on the various alumina-containing catalysts A–R whose metal composition is given again in Table I.

The operation is so conducted as to obtain a clear octane number of 96.2. The experimental conditions are as follows:

| Pressure | 20 bars |
| Molar H$_2$/hydrocarbons ratio | 5 |
| Weight of naphtha/weight of catalyst/hour | 3 |

The reactor inlet temperature is 490°±1° C. It suffices to raise it progressively to 530° C. to maintain a constant octane number.

Table I gives, for catalysts A–R as used, the C$_5$+ yield and the % hydrogen in the recycle gas when the desired octane number has been obtained.

TABLE I

| CATALYST | | | Yield % C$_5$+ by weight | Recycle gas % H$_2$ by mole |
|---|---|---|---|---|
| % Pt | % Rh | % additional metal | | |
| A 0.2 | 0.05 | 0.5% Chromium | 82.2 | 82.2 |
| B 0.2 | 0.05 | 0.5% Molybdenum | 82.3 | 82.5 |
| C 0.2 | 0.05 | 0.5% Tungsten | 82.6 | 82.7 |
| D 0.2 | 0.05 | 0.5% Manganese | 82.4 | 82.3 |
| E 0.2 | 0.05 | 0.5% Rhenium | 82.4 | 82.3 |
| F 0.2 | 0.05 | 0.5% Zinc | 82.3 | 82.2 |
| G 0.2 | 0.05 | 0.5% Cadmium | 82.3 | 82.4 |
| H 0.2 | 0.05 | 0.5% Gallium | 82.5 | 82.4 |
| I 0.2 | 0.05 | 0.5% Indium | 82.3 | 82.5 |
| J 0.2 | 0.05 | 0.5% Thallium | 82.2 | 82.4 |
| K 0.2 | 0.05 | 0.5% Germanium | 82.6 | 82.6 |
| L 0.2 | 0.05 | 0.5% Tin | 82.6 | 82.4 |
| M 0.2 | 0.05 | 0.5% Thorium | 82.4 | 82.4 |
| N 0.2 | 0.05 | 0.5% Cerium | 82.4 | 82.3 |
| O 0.2 | 0.05 | 0.5% Samarium | 82.4 | 82.4 |
| P 0.2 | 0.05 | 0.5% Lanthanum | 82.4 | 82.3 |
| Q 0.2 | 0.05 | 0.5% Titanium | 82.5 | 82.3 |
| R 0.2 | 0.05 | 0.5% Zirconium | 82.6 | 82.2 |

Catalysts a–r have been prepared; their composition and properties are identical to those of catalysts A–R except that rhodium has been replaced by osmium in their composition.

All of catalysts a–r contain 0.20% of platinum, 0.05% of osmium and 0.50% of a third element as stated for each of the catalysts a–r:

| a — chromium | j — thallium |
| b — molybdenum | k — germanium |
| c — tungsten | l — tin |
| d — manganese | m — thorium |
| e — rhenium | n — cerium |
| f — zinc | o — samarium |
| g — cadmium | p — lanthanum |
| h — gallium | q — titanium |
| i — indium | r — zirconium |

Catalysts a–r have all been prepared with alumina having a specific surface of 240 m$^2$/g and a pore volume of 59 cc/g.

Catalyst a was prepared by adding to 100 g of alumina 100 cc of an aqueous solution containing:
0.96 g of chromic anhydride (CrO$_3$)
2.24 g of concentrated HCl (d=1.19)
8 g of an aqueous chloroplatinic acid solution of 2.5% b.w. Pt content.
2.00 g of an aqueous chlorosmic acid solution of 2.5% b.w. Os content.

The components were contacted for 5 hours, filtered, dried for 1 hour at 100° C., roasted for 4 hours at 530° C. in dry air (dried with activated alumina), then reduced in a stream of dry hydrogen (activated alumina) for 2 hours at 450° C.

The resulting catalyst contains, by weight with respect to the catalyst carrier:
0.20% of platinum
0.05% of osmium
0.50% of chromium
1.14% of chlorine.

Catalyst d was prepared by adding to 100 g of alumina 100 cc of an aqueous solution containing:
2.30 g of manganese nitrate Mn(NO$_3$)$_2$(6H$_2$O)
2.24 g of concentrated HCl (d=1.19)
8 g of an aqueous chloroplatinic acid solution of 2.5% b.w. Pt content.
2.00 g of an aqueous chlorosmic acid solution of 2.5% b.w. Os content.

The components were contacted for 5 hours, filtered, dried for 1 hour at 100° C., roasted for 4 hours at 530° C. in dry air (dried with activated alumina), then reduced in a stream of dry hydrogen (activated alumina) for 2 hours at 450° C.

The resulting catalyst contains, by weight with respect to the catalyst carrier:
0.20% of platinum
0.05% of osmium
0.50% of manganese
1.14% of chlorine.

Catalyst f was prepared by adding to 100 g of alumina, 100 cc of an aqueous solution containing:
0.22 g of zinc sulfate (ZnSO$_4$, 7H$_2$O)
2.24 g of concentrated HCl (d=1.19)
8 g of an aqueous chloroplatinic acid solution of 2.5% b.w. Pt content.
2 g of an aqueous chlorosmic acid solution of 2.5% Os content.

The components were contacted for 5 hours, filtered, dried for 1 hour at 100° C., roasted for 4 hours at 530° C. in dry air (drying with activated alumina), then reduced in a stream of dry hydrogen (activated alumina) for 2 hours at 450° C.

The resulting catalyst contains, by weight with respect to the catalyst carrier:
0.20% of platinum
0.05% of osmium
0.50% of zinc
1.14% of chlorine.

Catalyst h was prepared by adding to 100 g of alumina 100 cc of an aqueous solution containing:
10 cc of gallium nitrate as a solution containing 50 g of gallium per liter.
2.24 g of concentrated HCl (d=1.19)
8 g of an aqueous chloroplatinic acid solution of 2.5% b.w. Pt content.
2.00 g of an aqueous chlorosmic acid solution of 2.5% b.w. Os content.

The components were contacted for 5 hours, filtered, dried for 1 hour at 100° C., roasted for 4 hours at 530° C. in dry air (dried with activated alumina), then reduced in a stream of dry hydrogen (activated alumina) for 2 hours at 450° C. The resulting catalyst contains, by weight with respect to the catalyst carrier:
0.20% of platinum
0.05% of osmium
0.50% of gallium
1.14% of chlorine.

Catalyst l was prepared by adding to 100 g of alumina, 100 cc of an aqueous solution containing:
2.6 g of tin acetate solution of 22% tin content
2.24 g of concentrated HCl (d=1.19)
8 g of an aqueous chloroplatinic acid solution of 2.5% b.w. Pt content.
2.00 g of an aqueous chlorosmic solution of 2.5% b.w. Os content.

The components were contacted for 5 hours, filtered, dried for 1 hour at 100° C., roasted for 4 hours at 530° C. in dry air (dried with activated alumina), then reduced in a stream of dry hydrogen (activated alumina) for 2 hours at 450° C. The resulting catalyst contains, by weight with respect to the catalyst carrier:
0.20% of platinum
0.05% of osmium
0.50% of tin
1.14% of chlorine.

Catalyst p was prepared by adding to 100 g of alumina, 100 cc of an aqueous solution containing:
5.00 g of a lanthanum nitrate solution of 10% lanthanum content
2.24 g of concentrated HCl (d=1.19)
8 g of an aqueous chloroplatinic acid solution of 2.5% b.w. Pt content
2.00 g of an aqueous chlorosmic acid solution of 2.5% b.w. Os content.

The components were contacted for 5 hours, filtered, dried for 1 hour at 100° C., roasted for 4 hours at 530° C. in dry air (dried with activated alumina), then reduced in a stream of dry hydrogen (activated alumina) for 2 hours at 450° C. The resulting catalyst contains, by weight with respect to the catalyst carrier:
0.20% of platinum
0.05% of osmium
0.50% of lanthanum
1.14% of chlorine.

Catalyst r was prepared by adding to 100 g of alumina 100 cc of an aqueous solution containing:
6.67 g of a zirconium oxychrloride solution of 7.5% zirconium content
2.24 g of concentrated HCl (d=1.19)
8 g of an aqueous chloroplatinic acid solution of 2.5% b.w. Pt content
2.00 g of an aqueous chlorosmic acid solution of 2.5% b.w. Os content.

The components were contacted for 5 hours, filtered, dried for 1 hour at 100° C., roasted for 4 hours at 530° C. in dry air (dried with activated alumina), then reduced in a stream of dry hydrogen (activated alumina) for 2 hours at 450° C. The resulting catalyst contains, by weight with respect to the catalyst carrier:
0.20% of platinum
0.05% of osmium
0.50% of zirconium
1.14% of chlorine.

The other catalysts were prepared in the same manner, according to similar methods, and they were tested in the same manner as previously described and with the same naphtha as previously defined.

Table II gives, for the catalysts a–r, the C$_5$+ yield and the % hydrogen contained in the recycle gas when the desired octane number has been attained.

TABLE II

| CATALYST % by weight | | | Yield % C$_5$+ by weight | Recycle gas % H$_2$ by mole |
|---|---|---|---|---|
| % Pt | % Os | % additional metal | | |
| a | 0.2 | 0.05 | 0.5% Chromium | 82.3 | 82.2 |
| b | 0.2 | 0.05 | 0.5% Molybdenum | 82.2 | 82.5 |
| c | 0.2 | 0.05 | 0.5% Tungsten | 82.6 | 82.6 |
| d | 0.2 | 0.05 | 0.5% Manganese | 82.4 | 82.4 |

TABLE II-continued

| | CATALYST % by weight | | | Yield % C$_5$+ by weight | Recycle gas % H$_2$ by mole |
|---|---|---|---|---|---|
| | % Pt | % Os | % additional metal | | |
| e | 0.2 | 0.05 | 0.5% Rhenium | 82.5 | 82.5 |
| f | 0.2 | 0.05 | 0.5% Zinc | 82.2 | 82.2 |
| g | 0.2 | 0.05 | 0.5% Cadmium | 82.3 | 82.2 |
| h | 0.2 | 0.05 | 0.5% Gallium | 82.4 | 82.5 |
| i | 0.2 | 0.05 | 0.5% Indium | 82.6 | 82.5 |
| j | 0.2 | 0.05 | 0.5% Thallium | 82.3 | 82.3 |
| k | 0.2 | 0.05 | 0.5% Germanium | 82.5 | 82.6 |
| l | 0.2 | 0.05 | 0.5% Tin | 82.6 | 82.5 |
| m | 0.2 | 0.05 | 0.5% Thorium | 82.3 | 82.3 |
| n | 0.2 | 0.05 | 0.5% Cerium | 82.3 | 82.2 |
| o | 0.2 | 0.05 | 0.5% Samarium | 82.3 | 82.3 |
| p | 0.2 | 0.05 | 0.5% Lanthanum | 82.2 | 82.3 |
| q | 0.2 | 0.05 | 0.5% Titanium | 82.3 | 82.4 |
| r | 0.2 | 0.05 | 0.5% Zirconium | 82.4 | 82.3 |

EXAMPLE 1A

This example is given for comparison and is not within the scope of this invention. Example 1 is repeated by using a catalyst containing 0.25% of platinum (one single metal element), a catalyst containing 0.20% of platinum and 0.05% of rhodium, and a third one containing 0.20% of platinum and 0.05% of osmium.

Each of these catalysts contains about 1.14% of chlorine.

Table II A reports, for these three catalysts as used, the C$_5$+ yield and the % hydrogen contained in the recyle gas when the desired octane number has been reached.

It may be observed that, when using a catalyst containing only platinum, or even when using a catalyst containing only platinum and rhodium or osmium, the yields are substantially lower than those obtained with catalysts A-R and a-r as shown in Tables I and II.

TABLE II A

| CATALYST | Yield C$_5$+ (b. w.) | Recycle gas % H$_2$ by mole |
|---|---|---|
| 0.25% Pt | 81.8 | 81.6 |
| 0.20% Pt; 0.05% Rh | 81.5 | 81.6 |
| 0.20% Pt; 0.05% Os | 81.6 | 81.5 |

EXAMPLE 2

Example 1 is repeated while using catalysts A'-R', a'-r', A"-R" and a"-r" identical to catalysts A-R and a-r, except that each of the catalysts A'-R' and a'-r' contains 0.004% of the third metal element and each of the catalysts A"-R" and a"-r" contains 0.08% of the third metal element. All catalysts contain 1.14% of chlorine.

Catalysts A'-R' and a'-r' have given in each case practically the same results as the catalyst of Table II A containing 0.20% of platinum and 0.05% of rhodium or osmium: catalysts A'-R' and a'-r' have an insufficient content of the third metal of group VIII. The results obtained with catalysts A"-R" and a"-r" are given in Tables IV and IV bis. They are substantially the same as those obtained in Tables I and II.

TABLE IV

| | CATALYST % by weight | | | Yield % C$_5$+ by weight | Recycle gas % H$_2$ by mole |
|---|---|---|---|---|---|
| | % Pt | % Rh | % additional metal | | |
| A" | 0.2 | 0.05 | 0.08% Chromium | 82.1 | 82.1 |
| B" | 0.2 | 0.05 | 0.08% Molybdenum | 82.2 | 82.4 |
| C" | 0.2 | 0.05 | 0.08% Tungsten | 82.5 | 82.5 |
| D" | 0.2 | 0.05 | 0.08% Manganese | 82.4 | 82.2 |
| E" | 0.2 | 0.05 | 0.08% Rhenium | 82.3 | 82.3 |
| F" | 0.2 | 0.05 | 0.08% Zinc | 82.2 | 82.2 |
| G" | 0.2 | 0.05 | 0.08% Cadmium | 82.2 | 82.3 |
| H" | 0.2 | 0.05 | 0.08% Gallium | 82.4 | 82.4 |
| I" | 0.2 | 0.05 | 0.08% Indium | 82.3 | 82.4 |
| J" | 0.2 | 0.05 | 0.08% Thallium | 82.1 | 82.5 |
| K" | 0.2 | 0.05 | 0.08% Germanium | 82.5 | 82.5 |
| L" | 0.2 | 0.05 | 0.08% Tin | 82.5 | 82.5 |
| M" | 0.2 | 0.05 | 0.08% Thorium | 82.4 | 82.4 |
| N" | 0.2 | 0.05 | 0.08% Cerium | 82.3 | 82.3 |
| O" | 0.2 | 0.05 | 0.08% Samarium | 82.4 | 82.5 |
| P" | 0.2 | 0.05 | 0.08% Lanthanum | 82.4 | 82.2 |
| Q" | 0.2 | 0.05 | 0.08% Titanium | 82.4 | 82.2 |
| R" | 0.2 | 0.05 | 0.08% Zirconium | 82.5 | 82.2 |

TABLE IV bis

| | CATALYST % by weight | | | Yield % C$_5$+ by weight | Recycle gas % H$_2$ by mole |
|---|---|---|---|---|---|
| | % Pt | % Os | % additional metal | | |
| a" | 0.2 | 0.05 | 0.08% Chromium | 82.1 | 82.0 |
| b" | 0.2 | 0.05 | 0.08% Molybdenum | 82.2 | 82.3 |
| c" | 0.2 | 0.05 | 0.08% Tungsten | 82.4 | 82.4 |
| d" | 0.2 | 0.05 | 0.08% Manganese | 82.4 | 82.1 |
| e" | 0.2 | 0.05 | 0.08% Rhenium | 82.1 | 82.3 |
| f" | 0.2 | 0.05 | 0.08% Zinc | 82.1 | 82.1 |
| g" | 0.2 | 0.05 | 0.08% Cadmium | 82.2 | 82.2 |
| h" | 0.2 | 0.05 | 0.08% Gallium | 82.4 | 82.4 |
| i" | 0.2 | 0.05 | 0.08% Indium | 82.3 | 82.4 |
| j" | 0.2 | 0.05 | 0.08% Thallium | 82.1 | 82.4 |
| k" | 0.2 | 0.05 | 0.08% Germanium | 82.2 | 82.4 |
| l" | 0.2 | 0.05 | 0.08% Tin | 82.4 | 82.5 |
| m" | 0.2 | 0.05 | 0.08% Thorium | 82.4 | 82.5 |
| n" | 0.2 | 0.05 | 0.08% Cerium | 82.3 | 82.3 |
| o" | 0.2 | 0.05 | 0.08% Samarium | 82.4 | 82.3 |
| p" | 0.2 | 0.05 | 0.08% Lanthanum | 82.3 | 82.2 |
| q" | 0.2 | 0.05 | 0.08% Titanium | 82.3 | 82.1 |
| r" | 0.2 | 0.05 | 0.08% Zirconium | 82.4 | 82.1 |

EXAMPLE 3

The production of gasoline of very high octane number obliges to operate under very severe conditions which could be hardly supported by the catalysts employed up to day. The present example shows that it is quite possible to use the catalysts according to the invention, even in particularly severe conditions, in view of obtaining gasoline of very high octane number.

The charge of Example 1 is treated in view of producing gasoline of 103 clear octane number. Catalysts A to R and a-r are used and compared to rhodium or osmium free catalysts A$_1$-R$_1$. The other properties of the catalysts A$_1$-R$_1$ are those of the catalysts A-R and a-r employed in Example 1. The content of metal elements is only slightly modified, so that the total content of metal elements is identical for catalysts A$_1$-R$_1$ and catalysts A-R and a-r. Each of these catalysts contains 1.14% of chlorine.

The experimental conditions are as follows:

| | |
|---|---|
| Pressure | 10 bars |
| Temperature | 530° C. |
| H$_2$/hydrocarbons molar ratio | 8 |

-continued

| Naphtha weight/catalyst weight/hour | 1.65 |
|---|---|

Table V reports the $C_5+$ yield and the hydrogen content of the recycle gas after 200 hours. By way of comparison, when operating under the same conditions with a catalyst containing 0.2% of platinum and 0.05% of rhodium, the yield of $C_5+$ is 75.1 by weight and the molar hydrogen content is 74.8%; again, by way of comparison, when operating under the same conditions with a catalyst containing 0.2% of platinum and 0.05% of osmium, the $C_5+$ yield is 75 by weight and the molar hydrogen content is 74.6.

TABLE V

| CATALYST % by weight | | | | Yield % $C_5$ by weight | Recycle gas % $H_2$ by mole |
|---|---|---|---|---|---|
| | % Pt | % Rh | Os | % additional metal | | |
| A | 0.2 | 0.05 | — | 0.5 Chromium | 79.4 | 78.5 |
| a | 0.2 | — | 0.05 | 0.5 Chromium | 79.3 | 78.5 |
| A1 | 0.25 | — | — | 0.5 Chromium | 77.4 | 77.8 |
| B | 0.2 | 0.05 | — | 0.5 Molybdenum | 79.3 | 78.4 |
| b | 0.2 | — | 0.05 | 0.5 Molybdenum | 79.4 | 78.3 |
| B1 | 0.25 | — | — | 0.5 Molybdenum | 77.4 | 77.6 |
| C | 0.2 | 0.05 | — | 0.5 Tungsten | 79.5 | 78.6 |
| c | 0.2 | — | 0.05 | 0.5 Tungsten | 79.3 | 78.3 |
| C1 | 0.25 | — | — | 0.5 Tungsten | 77.6 | 77.7 |
| D | 0.2 | 0.05 | — | 0.5 Manganese | 79.6 | 78.8 |
| d | 0.2 | — | 0.05 | 0.5 Manganese | 79.4 | 78.7 |
| D1 | 0.25 | — | — | 0.5 Manganese | 77.8 | 78.5 |
| E | 0.2 | 0.05 | — | 0.5 Rhenium | 79.4 | 78.8 |
| e | 0.2 | — | 0.05 | 0.5 Rhenium | 79.4 | 78.7 |
| E1 | 0.25 | — | — | 0.5 Rhenium | 77.5 | 78.0 |
| F | 0.2 | 0.05 | — | 0.5 Zinc | 79.4 | 78.5 |
| f | 0.2 | — | 0.05 | 0.5 Zinc | 79.5 | 78.5 |
| F1 | 0.25 | — | — | 0.5 Zinc | 77.7 | 78.2 |
| G | 0.2 | 0.05 | — | 0.5 Cadmium | 79.1 | 78.5 |
| g | 0.2 | — | 0.05 | 0.5 Cadmium | 79.3 | 78.3 |
| G1 | 0.25 | — | — | 0.5 Cadmium | 77.5 | 77.9 |
| H | 0.2 | 0.05 | — | 0.5 Gallium | 79.8 | 78.8 |
| h | 0.2 | — | 0.05 | 0.5 Gallium | 79.6 | 78.7 |
| H1 | 0.25 | — | — | 0.5 Gallium | 77.7 | 77.9 |
| I | 0.2 | 0.05 | — | 0.5 Indium | 79.4 | 78.7 |
| i | 0.2 | — | 0.05 | 0.5 Indium | 79.4 | 78.6 |
| i1 | 0.25 | — | — | 0.5 Indium | 77.6 | 78.0 |
| J | 0.2 | 0.05 | — | 0.5 Thallium | 79.3 | 78.6 |
| j | 0.2 | — | 0.05 | 0.5 Thallium | 79.4 | 78.5 |
| J1 | 0.25 | — | — | 0.5 Thallium | 77.3 | 77.5 |
| K | 0.2 | 0.05 | — | 0.5 Germanium | 79.4 | 78.7 |
| k | 0.2 | — | 0.05 | 0.5 Germanium | 79.4 | 78.6 |
| K1 | 0.25 | — | — | 0.5 Germanium | 77.9 | 78.0 |
| L | 0.2 | 0.05 | — | 0.5 Tin | 79.5 | 78.7 |
| l | 0.2 | — | 0.05 | 0.5 Tin | 79.3 | 78.6 |
| L1 | 0.25 | — | — | 0.5 Tin | 77.7 | 78.1 |
| M | 0.2 | 0.05 | — | 0.5 Thorium | 79.4 | 78.6 |
| m | 0.2 | — | 0.05 | 0.5 Thorium | 79.4 | 78.4 |
| M1 | 0.25 | — | — | 0.5 Thorium | 77.6 | 77.6 |
| N | 0.2 | 0.05 | — | 0.5 Cerium | 79.6 | 78.7 |
| n | 0.2 | — | 0.05 | 0.5 Cerium | 79.4 | 78.6 |
| N1 | 0.25 | — | — | 0.5 Cerium | 77.5 | 77.5 |
| O | 0.2 | 0.05 | — | 0.5 Samarium | 79.6 | 78.6 |
| o | 0.2 | — | 0.05 | 0.5 Samarium | 79.5 | 78.6 |
| O1 | 0.25 | — | — | 0.5 Samarium | 77.5 | 77.4 |
| P | 0.2 | 0.05 | — | 0.5 Lanthanum | 79.5 | 78.5 |
| p | 0.2 | — | 0.05 | 0.5 Lanthanum | 79.4 | 78.5 |
| P1 | 0.25 | — | — | 0.5 Lanthanum | 77.5 | 77.4 |
| Q | 0.2 | 0.05 | — | 0.5 Titanium | 79.4 | 78.5 |
| q | 0.2 | — | 0.05 | 0.5 Titanium | 79.3 | 78.5 |
| Q1 | 0.25 | — | — | 0.5 Titanium | 77.5 | 78.0 |
| R | 0.2 | 0.05 | — | 0.5 Zirconium | 79.4 | 78.5 |
| r | 0.2 | — | 0.05 | 0.5 Zirconium | 79.3 | 78.5 |
| R1 | 0.25 | — | — | 0.5 Zirconium | 77.6 | 78.0 |

EXAMPLE 4

Example 1 is repeated by using catalyst $D_1$ of Example 3 containing neither rhodium nor osmium.

The yield of $C_5+$ and the % hydrogen contained in the recycle gas when the desired octane number (96.2) has been obtained are given in Table VI.

TABLE VI

| CATALYST % by weight | | | YIELD | RECYCLE GAS |
|---|---|---|---|---|
| | % Pt | % of additional metal | % $C_5+$ (b. w.) | % $H_2$ by mole |
| $D_1$ | 0.25 | 0.5 Manganese | 82.0 | 82.4 |

Catalyst $D_1$ thus yields results only slightly lower than those obtained by using catalysts D and d. But the advantage of the catalysts according to the invention is mainly their very substantially increased life time, as compared to that of the catalysts employed up to day.

Table VII thus shows that at mid-run, by using catalyst $D_1$, the yield of $C_5+$ and the % hydrogen content of the recycle gas are respectively lower than the yield of $C_5+$ and the % hydrogen content of the recycle gas, as obtained when using catalyst D and d. Mid-run time depends on the catalyst; it is the higher as the catalyst is more stable; it is, with only a few hours difference, about 560 hours for catalysts D and d and only about 380 hours for catalyst $D_1$. For guidance, mid-run time is about 410 hours for a catalyst containing 0.2% of platinum and 0.05% of rhodium and 415 hours for a catalyst containing 0.2% of platinum and 0.05% of osmium.

TABLE VII

| CATALYST | | | % b. w. % of additional metal | YIELD % $C_5+$ mid-run (b. w.) | RECYCLE GAS % $H_2$ mid-run (in moles) |
|---|---|---|---|---|---|
| | % Pt | % Rh | % Os | | | |
| D | 0.20 | 0.05 | — | 0.5 Manganese | 82.1 | 82.1 |
| d | 0.20 | — | 0.05 | 0.5 Manganese | 82.2 | 82.2 |
| $D_1$ | 0.25 | — | — | 0.5 Manganese | 81.4 | 81.6 |

Although catalysts $D_1$, D" and d" cannot be perfectly compared since catalyst $D_1$ has not the same total content of metal elements as the catalysts D" and d", it must be noted that by using catalysts D" and d" conforming to the invention and containing 0.2% of platinum, 0.05% of rhodium (catalyst D") and 0.05% of osmium (catalyst d") and relatively low amounts of manganese, the results obtained in Tables IV and IV bis are slightly higher than those obtained in Table VI by using catalyst $D_1$ which does not conform to the invention and contains 0.25% of platinum and 0.5% of manganese without rhodium or osmium. Above all, as shown hereinbefore, the advantage of the catalysts conforming to the invention mainly lies in their very long life time. Thus, by comparing, on the one hand, the results obtained with catalyst $D_1$ at mid-run in Table VII and, on the other hand, the results obtained with catalysts D" and d" at mid-run in Table VIII, it clearly appears that the $C_5+$ yield and the % hydrogen of the recycle gas are substantially better when using catalysts D" and d", thus showing superiority of catalysts such as D" and d" with respect to a catalyst such as $D_1$. Further, the mid-run time of about 530 hours, when using catalysts D"

and d", is far longer than that observed with catalyst D₁, i.e. about 380 hours.

TABLE VIII

| | CATALYST % by weight | | | | YIELD % C₅+ mid-run (b. w.) | RECYCLE GAS % H₂ mid-run (b. w.) |
|---|---|---|---|---|---|---|
| | % Pt | % Ru | % Os | % of additional metal | | |
| D" | 0.2 | 0.05 | — | 0.08 Manganese | 81.6 | 81.7 |
| d" | 0.2 | — | 0.05 | 0.08 Manganese | 81.7 | 81.8 |

EXAMPLE 5

Four catalysts S, S₁, T and T₁ are prepared; their specific surface is 230 m²/g, their pore volume 54 cc/g and their chlorine content 1.14%.

These catalysts were prepared by using alumina of 240 m²/g specific surface and 59 cc/g pore volume. Catalyst S has been prepared by adding to 100 g of alumina, 100 cc of an aqueous solution of:

1.90 g concentrated HCl (d=1.19)
14 g of an aqueous solution of chloroplatinic acid of 2.5% b.w. Pt content
0.8 g of an aqueous solution of rhodium trichloride of 2.5% b.w. rhodium content, and
2.30 g of manganese nitrate.

The components were contacted for 5 hours, filtered, dried for 1 hour at 100° C., then roasted at 530° C. in dry air (dried with activated alumina) and finally reduced in a stream of dry hydrogen (activated alumina) for 2 hours at 450° C. The resulting catalyst contains, with respect to alumina:

0.35% of platinum
0.02% of rhodium
0.50% of manganese
1.14% of chlorine.

Catalyst T was prepared according to the same method, except that rhodium was substituted with osmium (as an osmic acid solution of 2.50% by b.w. osmium content).

The resulting catalyst contains:
0.35% of platinum
0.02% of osmium
0.50% of manganese
1.14% of chlorine.

Catalysts S₁ and T₁ were also prepared according to the same method, except that they are free of manganese. Catalysts S and T₁ contain 1.14% of chlorine. These four catalysts were tested in a n-heptane test. The operation is so conducted as to obtain the same conversion with each of the catalysts S, S₁, T and T₁. The experimental conditions are as follows:
pressure: 20 bars
H₂/HC molar ratio: 5
weight of naphtha/weight of catalyst/hour: 3.

The reactor inlet temperature is 490° C.±2° C.

It is so selected for each catalyst that the same conversion is obtained with each of the two catalysts (88% in each case).

Table IX summarizes for the catalysts S, S₁, T and T₁: the molar yield of toluene, the amount of light hydrocarbons produced and the ratio toluene/light hydrocarbons which characterize the selectivity of the catalyst (by light hydrocarbons, we mean the C₁-C₄ cut). The higher the toluene/light hydrocarbons ratio, the better the selectivity of the catalyst.

TABLE IX

| CATALYST | % Pt | % Rh | % Os | % Mn | % Lights (moles) | % Toluene lights | Toluene/light hydrocarbons (molar ratio) |
|---|---|---|---|---|---|---|---|
| S | 0.35 | 0.02 | — | 0.5 | 35.0 | 25.0 | 0.714 |
| S₁ | 0.35 | 0.02 | — | — | 40.3 | 24.1 | 0.598 |
| T | 0.35 | — | 0.02 | 0.5 | 35.2 | 24.8 | 0.707 |
| T₁ | 0.35 | — | 0.02 | — | 40.5 | 24.1 | 0.595 |

This Table shows that introducing manganese substantially improves the selectivity of the resulting catalyst. In the same manner, adding one or more of the other elements according to the invention improves the behavior of the catalyst.

EXAMPLE 6

It could be deduced from example 5 that the better results obtained with catalysts S and T, as compared with catalysts S₁ and T₁, are attributable to the mere addition of manganese to the catalysts S and T with increase of the total metal content. In fact, when comparing in Table X (n-heptane test under the same operating conditions as for example 5) the results obtained with catalysts S and T and with catalysts S₂, S₃, T₂ and T₃ (series S contains rhodium and series T contains osmium) which all have the same total content of metal elements, except that catalysts S₂, S₃, T₂ and T₃ are free of manganese, it is found that catalysts S and T give the best results, the conversion being 88% with each catalyst. Catalysts S₂, S₃, T₂ and T₃ have been prepared as described for catalysts S₁ and T₁. Their metal content is given in Table X and their chlorine content is 1.14%.

TABLE X

| CATALYST | % Pt | % Rh | % Os | % Mn | % Lights moles | % Toluene lights | Toluene/light hydrocarbons (molar ratio) |
|---|---|---|---|---|---|---|---|
| S | 0.35 | 0.02 | — | 0.5 | 35.0 | 25.0 | 0.714 |
| S₂ | 0.35 | 0.07 | — | 0 | 40.3 | 24.0 | 0.595 |
| S₃ | 0.40 | 0.02 | — | 0 | 40.2 | 24.0 | 0.597 |
| T | 0.35 | — | 0.02 | 0.5 | 35.2 | 24.9 | 0.707 |
| T₂ | 0.35 | — | 0.07 | 0 | 40.4 | 24.1 | 0.596 |
| T₃ | 0.40 | — | 0.02 | 0 | 40.3 | 24.2 | 0.600 |

It appears from these examples that the preferred additional metals are essentially: tungsten, manganese, rhenium, gallium, germanium, tin, thorium, cerium and samarium.

What we claim:

1. A reforming process which comprises contacting a hydrocarbon fraction under reforming conditions in the presence of a catalyst containing a carrier and, by weight with respect to the catalyst carrier, (a) 0.005–1% of platinum, (b) 0.005–1% of rhodium or osmium, (c) 0.005–5% of an additional metal selected from the group consisting of chromium, tungsten, molybdenum, manganese, rhenium, gallium, indium, thallium, thorium, cerium, samarium, lanthanum, zinc, cadmium, titanium and zirconium, and (d) 0.1–10% of halogen.

2. A process according to claim 1, wherein the catalyst carrier is alumina.

3. A process according to claim 2, wherein the content of additional metal within the catalyst is 0.01–4% by weight of the catalyst carrier.

4. A process according to claim 2, wherein the content of additional metal within the catalyst is 0.05–3% by weight of the catalyst carrier.

5. A process according to claim 1, wherein the halogen of the catalyst is chlorine.

6. A new catalyst comprising alumina and, by weight with respect to alumina, (a) 0.005–1% of platinum, (b) 0.005–1% of rhodium or osmium, (c) 0.05–3% of an additional metal selected from the group consisting of chromium, tungsten, molybdenum, manganese, rhenium, gallium, indium, thallium, samarium, zinc, cadmium, titanium and zirconium, and (d) 0.1–10% of halogen.

7. A process according to claim 3, wherein the additional metal is tungsten.

8. A process according to claim 3, wherein the additional metal is manganese.

9. A process according to claim 3, wherein the additional metal is rhenium.

10. A process according to claim 3, wherein the additional metal is gallium.

11. A process according to claim 3, wherein the additional metal is thorium.

12. A process according to claim 3, wherein the additional metal is cerium.

13. A process according to claim 3, wherein the additional metal is samarium.

14. A catalyst according to claim 6, wherein said additional metal is manganese or rhenium.

15. A process according to claim 1, wherein the additional metal is manganese or rhenium.

16. A process according to claim 1, wherein said additional metal is manganese, rhenium or tungsten.

17. A process according to claim 1, wherein said additional metal is manganese, rhenium, tungsten or gallium.

18. A process according to claim 1, wherein the additional metal is manganese, rhenium, tungsten, gallium, or thorium.

19. A process according to claim 1, wherein the additional metal is manganese, rhenium, tungsten, gallium, thorium or cerium.

20. A process according to claim 1, wherein the additional metal is manganese, rhenium, tungsten, gallium, thorium, cerium or samarium.

21. A process according to claim 1, wherein the additional metal is manganese, rhenium or gallium.

22. A process according to claim 1, wherein the additional metal is manganese, rhenium or thorium.

23. A process according to claim 1, wherein the additional metal is manganese, rhenium or cerium.

24. A process according to claim 1, wherein the additional metal is manganese, rhenium or samarium.

25. A reforming process which comprises contacting a hydrocarbon fraction at reforming conditions with a catalyst comprising a catalyst carrier material containing, by weight percent based on the carrier,
(a) 0.005–1% platinum,
(b) 0.005–1% rhodium,
(c) 0.005–5% indium, and
(d) 0.1–10% halogen.

26. A catalyst comprising a carrier material containing, by weight percent based on the carrier,
(a) 0.005–1% platinum,
(b) 0.005–1% rhodium,
(c) 0.005–5% indium, and
(d) 0.1–10% halogen.

27. A reforming process which comprises contacting a hydrocarbon fraction under reforming conditions in the presence of a catalyst containing a carrier and, by weight with respect to the catalyst carrier, (a) 0.005–1% of platinum, (b) 0.005–1% of rhodium or osmium, (c) 0.005–5% of an additional metal selected from the group consisting of chromium, tungsten, molybdenum, manganese, gallium, indium, thallium, thorium, cerium, samarium, lanthanum, zinc, cadmium, titanium and zirconium, and (d) 0.1–10% of halogen.

28. A process according to claim 27, wherein the catalyst carrier is alumina.

29. A process according to claim 28, wherein the content of additional metal within the catalyst is 0.01–4% by weight of the catalyst carrier.

30. A process according to claim 28, wherein the content of additional metal within the catalyst is 0.05–3% by weight of the catalyst carrier.

31. A process according to claim 27, wherein the halogen of the catalyst is chlorine.

32. A new catalyst comprising alumina and, by weight with respect to alumina, (a) 0.005–1% of platinum, (b) 0.005–1% of rhodium or osmium, (c) 0.05–3% of an additional metal selected from the group consisting of chromium, tungsten, molybdenum, manganese, gallium, indium, thallium, samarium, zinc, cadmium, titanium and zirconium, and (d) 0.1–10% of halogen.

33. A process according to claim 29, wherein the additional metal is tungsten.

34. A process according to claim 29, wherein the additional metal is manganese.

35. A process according to claim 29, wherein the additional metal is gallium.

36. A process according to claim 29, wherein the additional metal is thorium.

37. A process according to claim 29, wherein the additional metal is cerium.

38. A process according to claim 29, wherein the additional metal is samarium.

39. A reforming process which comprises contacting a hydrocarbon fraction at reforming conditions with a catalyst comprising a catalyst carrier material containing, by weight based on the carrier,
(a) 0.005–1% platinum,
(b) 0.005–1% rhodium,
(c) 0.005–5% gallium, and
(d) 0.1–10% halogen.

40. A catalyst comprising a carrier material containing, by weight percent based on the carrier,
(a) 0.005–1% platinum,
(b) 0.005–1% rhodium,
(c) 0.005–5% gallium, and
(d) 0.1–10% halogen.

41. A process for reforming a hydrocarbon fraction which comprises contacting the hydrocarbon fraction with hydrogen at reforming conditions with a catalytic composite comprising a porous carrier material containing, on an elemental basis, about 0.005 to about 1 wt. % platinum, about 0.005 to about 1 wt. % rhodium, about 0.005 to about 5 wt. % rhenium and about 0.2 to about 5 wt. % halogen, wherein the metals have been incorporated with the carrier by impregnation of the carrier with one or more aqueous solutions of the metal salts, and further wherein the impregnated carrier has been subjected to reduction with hydrogen for 2 hours at a temperature of 450° C.

42. A catalytic composite comprising a porous carrier material containing, on an elemental basis, about 0.005 to about 1 wt. % platinum, about 0.005 to about 1 wt. % rhodium, about 0.005 to about 5 wt. % rhenium, and about 0.2 to about 5 wt. % halogen, wherein the metals have been incorporated with the carrier by impregnation of the carrier with one or more aqueous solutions of the metal salts, and further wherein the impregnated carrier has been subjected to reduction with hydrogen for 2 hours at a temperature of 450° C.

* * * * *